Oct. 11, 1938.  L. M. FRANCIS  2,132,464
MOVABLE DECK FOR VEHICLES
Filed Feb. 13, 1936  3 Sheets—Sheet 1
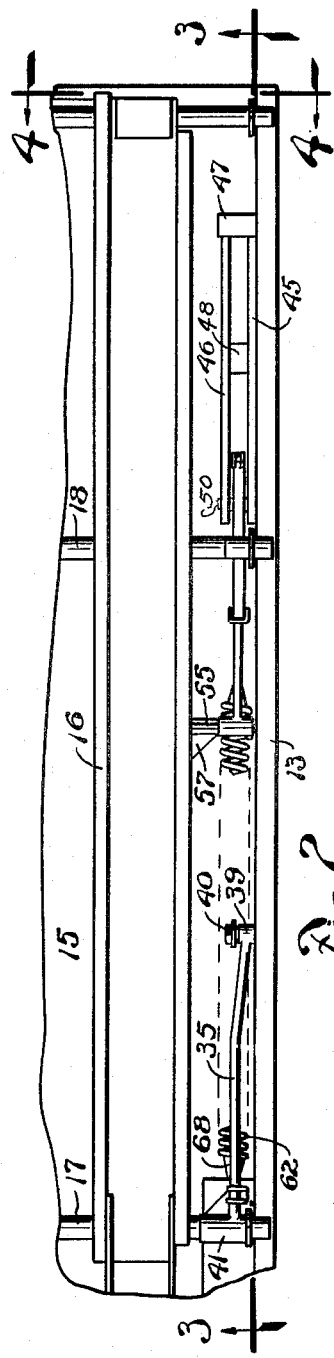
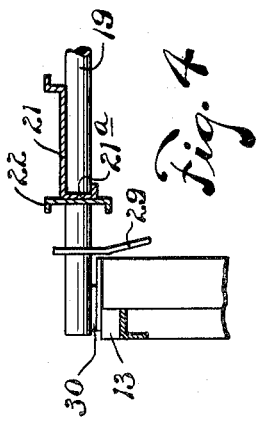
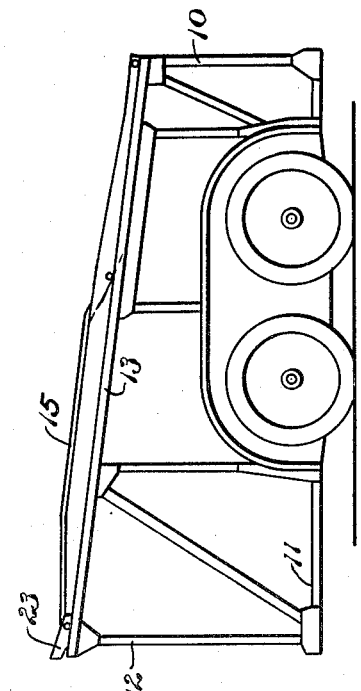
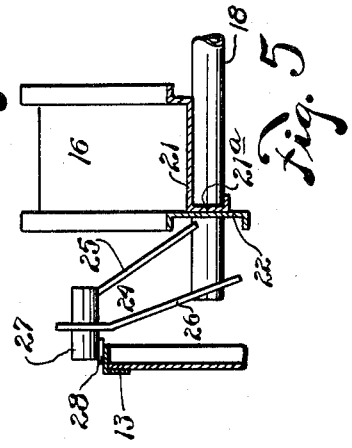
INVENTOR.
LYNN M. FRANCIS
BY Joseph Farley
ATTORNEY.

Oct. 11, 1938.   L. M. FRANCIS   2,132,464
MOVABLE DECK FOR VEHICLES
Filed Feb. 13, 1936   3 Sheets-Sheet 2
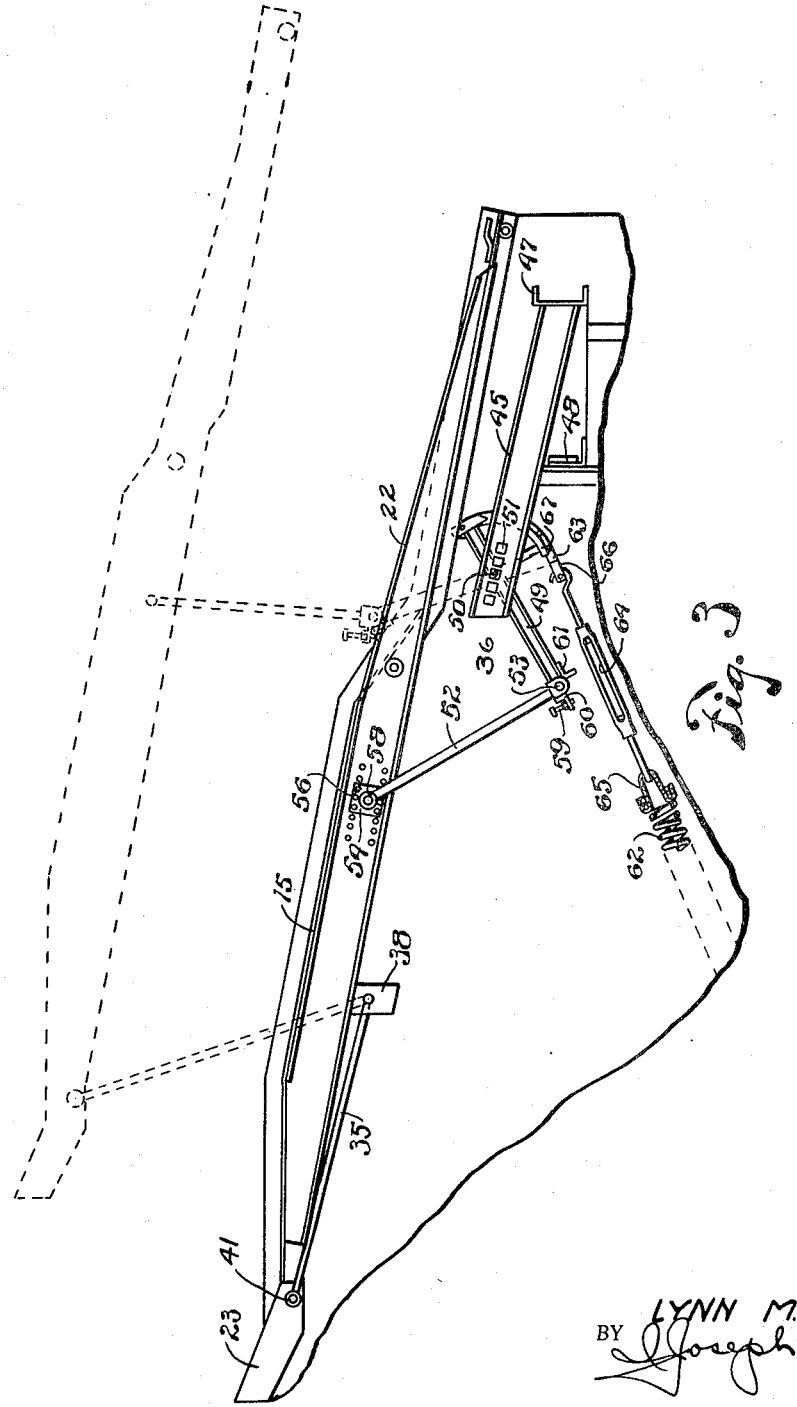
INVENTOR.
LYNN M. FRANCIS
BY Joseph Farley
ATTORNEY.

Oct. 11, 1938. L. M. FRANCIS 2,132,464
MOVABLE DECK FOR VEHICLES
Filed Feb. 13, 1936   3 Sheets-Sheet 3

INVENTOR.
LYNN M. FRANCIS
BY Joseph Farley
ATTORNEY.

Patented Oct. 11, 1938

2,132,464

UNITED STATES PATENT OFFICE 2,132,464

MOVABLE DECK FOR VEHICLES

Lynn M. Francis, Birmingham, Mich., assignor to Mechanical Handling Systems, Inc., Detroit, Mich., a corporation of Michigan Application February 13, 1936, Serial No. 63,719

15 Claims. (Cl. 296—1)

This invention relates to an improvement in construction of double deck vehicles and has a particular application to structures of the type now extensively used for the highway transportation of fully assembled automobiles from the assembly plants to the dealers or distributors. Because of the necessity of limiting the maximum height of a loaded transport of the above mentioned type, it is necessary to carefully consider the loading of the cars so that a double decking may be accomplished and the maximum number of cars carried, and still maintain a height which will be satisfactory for bridge clearances, etc. In carrying out this purpose, the upper deck is formed in such a way that a maximum of the space remaining above a car loaded on the lower deck is utilized, i. e. the top deck being highest at a point directly above the top of the lower car and the lowest point above the radiator or the engine section. It is apparent that if such an upper deck is, what might be termed, fitted over the shape of the lower car to obtain maximum use of the space, it would be impossible to drive the car onto the lower deck with the upper deck in place. It is also an important consideration with a type of haulaway unit in which cars are carried both on the truck itself and the trailer, that it be possible to drive the cars through and on the lower deck of the trailer and then onto the carrying tracks of the truck. As the carrying tracks on the truck are generally higher than the lower deck of the trailer, the top deck of the trailer must be moved entirely out of the way to provide for an adequate opening in the front of said trailer. It is therefore quite impractical to pivot the upper deck of the trailer at its forward end only and to provide for lifting up the back, although this would be sufficient for loading the trailer alone. It is therefore highly advantageous to have an upper deck of such construction that both front and rear portions can be quickly and easily moved out of the way while the front truck and the lower deck of the trailer are loaded. Prior devices to accomplish the purpose of simultaneously moving both the front and rear portions of the upper tracks out of the way, have in general been of the type of tracks swinging outwardly and upwardly, each track being separately hinged on an axis longitudinal of the trailer. While this construction has been widely used, it is somewhat cumbersome and hard to operate and also has the disadvantage of not being particularly adaptable to the use of a closed type of vehicle. Some prior devices adaptable to use with covered vehicles have been constructed to pivot the front end of the upper deck on an axis transversely of the trailer and to swing the rear end upward. However this construction does not always afford sufficient clearance to load cars through a trailer onto a truck. In the last mentioned construction attempt has been made to make the upward movement of the deck easy of operation by some form of spring balanced toggle mechanism. In such construction however, when a spring is used to operate a toggle which in turn is connected to move the upper deck, the required spring travel is necessarily great if the spring is to be effective over any practical range of operation.

It is a primary object of the present invention to provide an upper deck structure movable as a unit to an out of the way position with a translatory movement to an inoperative position substantially above its operative position.

It is an equally important object of the present invention to provide suitable counterbalancing means to assist the movement of said upper deck actuated by a spring so mounted in relation to the deck operating lever mechanism that the travel of said spring is less than that of the operating end of said lever mechanism. Such a combination enables a relatively heavy spring of short travel to be used to accomplish the desired result.

It is a further object of the present invention to provide a construction which while moving both the front and rear portions of the upper deck of the vehicle to an out of the way position, also affords a construction adaptable for use with a closed, or covered top vehicle.

The above and other objects of the invention will appear more fully in the following detailed description of an example of a preferred embodiment of my invention and by reference to the accompanying drawings forming a part hereof and wherein:—

Fig. 1 shows a side view of a trailer structure of the general type to which the invention is applicable and is a general view of the assembly of the mechanism to such a structure;

Fig. 2 is a top view of the upper track showing one of the tracks, the cross members, the side of the structure on which the upper deck rests, and the lever and spring unit;

Fig. 3 is a side view taken substantially on the line 3—3 of Fig. 2 and shows a general layout of the construction with full and dotted line showings of the upper deck in operative and inoperative positions respectively;

Fig. 4 is a vertical section on the line 4—4 of Fig. 2 and shows the construction of a support for a cross member;

Fig. 5 is a view similar to Fig. 4 showing a modified construction of a support for use when the cross member of the deck is below the top of the side frame;

Figure 6:
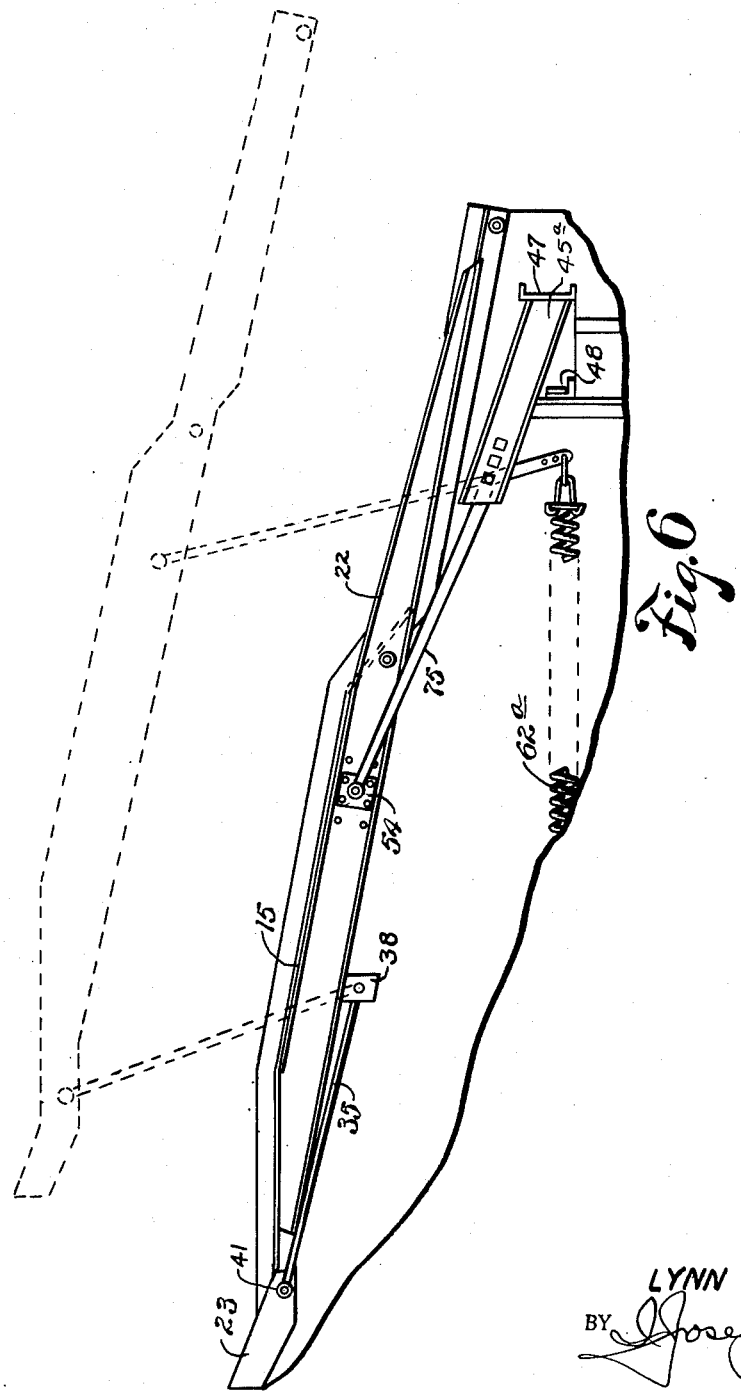
Fig. 6 is a view similar to Fig. 3 showing a modified construction of the lever and spring unit.

Considering Fig. 1 there is shown a vehicle structure 10 of the type commonly used for transport of completed automobiles. A lower deck 11 provided with suitable flooring or tracks (not shown) to support an automobile to be carried forms the lower portion of the structure and has built thereon vertical side frame structures 12 extending upwardly to support an upper deck, a longitudinally extending top frame member 13 forming the top of each of the vertical side frame structures 12.

As shown best in Fig. 2, the top deck automobile supporting structure designated generally by the reference character 15, is made up of two longitudinal extending channel-shaped tracks 16 held in proper spaced location by three, preferably tubular, cross members 17, 18 and 19. In detail there is shown in the structure as here illustrated a two-part construction of the tracks 16 of structural shapes as shown in Figs. 4 and 5, consisting of a Z member 21 lying on the top of the cross members 17, 18 and 19 with the downwardly extending flange 21a apertured and secured to the said cross members and a channel 22 which extends longitudinally of the track and forms one side thereof resting against, and being secured to, the flange 21a of the Z member 21. This combination of structural shapes provides adequate reinforcement for the vertical load to be carried, the channel 22 being used primarily for the purpose of giving the required rigidity to the tracks.

The front of each track 16 may be provided with the suitable upwardly projecting end 23, conventionally used for the purpose of limiting the forward travel of, and forming a stop for, the car to be carried thereby. Also the shape of the track 16 may be formed as shown to use to best advantage the space above a car loaded on the lower deck 11.

The entire top deck structure 15, as the above description indicates, is a separate compact unit suitable for the support of an automobile to be carried on the upper deck. The cross members 17, 18 and 19 with suitable fittings and extensions provide supports for this upper deck upon the longitudinally extending top frame members 13 of the vertical side frame structures 12.

Fig. 4 shows the manner in which both the ends of the cross members 17, 18 and 19 rest directly upon the side frame. A guide 29 may be secured to cross member 19 as shown, to assure a substantially definite lateral location of the track relatively to the frame, a seat 30 being provided for securing definite fore and aft location.

Figs. 2 and 3 show the details of a suitable mechanism by the operation of which the upper deck 15 may be swung from the operative position shown by the solid lines in Fig. 3 to an inoperative position as shown by the dotted lines. The above result is accomplished by the combined action of a front link 35 and a spring-balanced rear link mechanism 36.

The front link 35 has its lower end pivotally connected to a bracket 38 suitably secured to the side frame 12. The mounting may be accomplished as shown in Fig. 2 by the provision of a suitable bearing boss 39 on the end of the link 35 through which passes a bolt 40 to secure the link to the bracket 38. As also shown in Fig. 2, the opposite end of the link 35 is provided with a similar bearing boss 41 into which fits the projecting end of the front tubular cross member 17. It is apparent that the above construction makes possible the support of the front part of the top deck 15 and serves to guide it in a definite path when moved to and from its operative position, the link 35 pivoting upon the bearing 39, all as shown in Fig. 3. It is understood that a similar construction is provided on both the side frames 12.

The rear link mechanism 36 is supported on the side frame 12 by means of two spaced channels 45 and 46 secured to the inside of the side frame member 12 by short structural members 47 and 48 as shown in Figs. 2 and 3. Between the spaced channels 45 and 46 there is pivotally mounted a lever 49 upon a fulcrumed support provided by a suitable pin 50 extending through the aforementioned spaced channels 45 and 46. Provision is made by a plurality of spaced holes 51, as shown in Fig. 3, for varying the position of the fulcrum pin 50 relative to the channel members. The outer end of the lever 49 is connected by an articulated joint 53 with one end of an arm 52. The opposite end of the arm 52 is pivoted upon a bracket 54 which is secured to the channel 22 of the top deck 15. In detail this is shown in the present embodiment as accomplished by a short tube 55 welded to plate 56 and reinforced by a triangular plate 57, the tube 55 providing a trunnion on which is journalled an end bearing 58 of the arm 52.

It is understood that a similar link mechanism is provided on both sides of a vehicle, and considering the dotted position of parts as shown in Fig. 3, it will be apparent that when the deck 15 is moved upward, the lever 49 is swung in a clockwise direction about the pin 50. In order to limit the upward movement to a position substantially as shown dotted in Fig. 3, stop means are provided consisting of a set screw 59 threaded in a bracket 60 on the end of arm 52 and adapted to abut a bracket 61 provided on the end of lever 49. The upward movement of the entire unit is thereby limited by the contact of the projecting end of the set screw 59 upon a bracket 61 and is adjustable by said set screw 59.

To provide for easier operation a counterbalancing spring 62 is mounted to exert a tension upon the projecting end of the lever 49 through a chain 63. The chain 63 is secured to the end of the spring 62 by means of a turn-buckle 64, one end of which is hooked to a suitable fitting 65 on the spring 62 and the opposite end of which is hooked to a fitting 66 on the end of the chain 63. The chain 63 itself is mounted for operation in an arc shaped track 67 supported between the spaced channels 45 and 46 and the opposite end of the chain 63 is secured to the end of the lever 49, as previously indicated. The opposite end of the spring 62 as shown in Fig. 2 is secured to some suitable point on the side frame 12 by a fitting such as 68.

A modified construction is shown in Fig. 5 for use where, because of the configuration of the top frame member 13, one or more of the cross members 17, 18 or 19 is below said top frame. An extension bracket denoted generally as 24 is provided and is made up of suitable supporting braces 25, 26 connected at their lower ends to the cross member and carry at their upper ends a short section of tubing 27. The bracket 24 and tubing 27 thus provide a support for the tubular cross member, the end of the tube 27 of bracket 24 resting upon the longitudinal top side frame member 13. A similar bracket is provided on the opposite end of the cross member 18. For the purpose of more positively locating the tube 27 upon the member 13, a recessed seat, or cradle, 28 formed from a strip of metal may be secured to the member 13.

In the modified form shown in Fig. 6, the mechanism is somewhat simplified by the use of a bell crank lever 75 which performs the function of the lever 49, shown in Fig. 3. The bell crank lever is shown as mounted between a pair of channel members 45a, similar to the members 45, 46, and has its longer arm connected to the fitting 54 of the upper deck 15 and its shorter arm connected to a spring 62a which has its other end secured to some advantageous point on the trailer, not shown. It is noted that the same principle is employed in that a relatively large movement of the deck 15 is accomplished by a short travel of the spring 62a resulting from the difference in the length of the arms on the bell crank 75. The front link 35 and its connections are substantially the same as shown in Fig. 3. The major difference between the two constructions is the elimination in Fig. 6 of the arm 52, the chain 63, and the track 67.

Considering Fig. 3, the device is operated by first lifting the rear part of the upper deck, shown at the right in Fig. 3, which causes the entire deck 15 to pivot about the bearings 41. After this movement is accomplished, the track is in a position in which it might be used when it is only necessary to load a car directly underneath the upper deck. However, in order to complete the movement to the dotted position shown in Fig. 3, it is only necessary to push upwardly on the forward portion of the deck 15 or to pull the entire deck 15 rearwardly after first having pushed the rear end of the deck upwardly. The deck is then in an out-of-the-way position substantially parallel to the operative position and so located that it will not interfere with the driving of a car through the lower deck onto a higher forward vehicle.

Concerning the operation of the counterbalancing spring 62 in Fig. 3, it is noted that the leverages employed with the lever 49 are such that a relatively short travel of the spring 62 is used, while the deck 15 is moved through a materially greater travel. This feature of operation is very important in that it allows the use of a stiff spring of short travel easily mounted on the frame and obviates the difficulties encountered with some prior art devices. It is noted that the result of unequal travel between the spring and the deck is accomplished by the difference in lever arm on the lever 49. In Fig. 3 the chain 63 is operated in the track as shown for the purpose of giving a direction to the spring such that it can be easily mounted on the frame structure and still maintain the desired direction of pull on the end of the lever 49.

In the modification shown in Fig. 6, a bell crank 75 is used in place of the lever 49 and arm 52, shown in Fig. 3. In operation the two devices are similar and the idea of unequal lever arms is carried out on the bell crank 75, the lower arm of said bell crank connected with the spring 62a being materially shorter than the arm which connects to the deck 15. This accomplishes the result of a large movement of the deck 15 with a comparatively short travel of the spring 62a. It is noted that the shape of the bell crank makes possible the fore and aft mounting of the spring 62a, which direction allows for the use of a long spring.

While I have described my invention as applied to a specific construction, it is understood that I do not desire to limit myself to the specific details of the construction shown but that various modifications may be resorted to without departing from the principles of the invention. It is particularly to be noted that the construction without material variation can be adapted for use with many types of vehicles and is not specifically limited to a vehicle of the exact type shown in Fig. 1. It is also noted that application of the invention might easily be made to structures other than those to be used for transporting completed automobiles for which the illustrative embodiment has been especially designed.

I claim:

1. In an automobile transporting vehicle, a main frame, a movable upper deck structure and a fixed lower deck carried thereby, a pivotal mounting on said main frame, a lever mounted to swing on said pivotal mounting, a spring secured to said lever, and means connecting said upper deck structure with said lever at a distance from said pivotal mounting greater than the distance from said spring connection to said pivotal mounting.

2. The combination with an automobile transporting vehicle having a lower deck and a frame for supporting an upper deck structure, of a counterbalanced linkage for moving the upper deck of said vehicle from an operative to an inoperative position, comprising a lever pivoted intermediate its ends and mounted on said frame, means connecting one end of said lever with said upper deck structure, and a spring connected with the opposite end of said lever.

3. The combination with an automobile transporting vehicle having a lower deck and a frame for supporting an upper deck structure of a linkage connecting said upper deck with said frame and adapted to swing said upper deck with a translatory movement from an operative to an inoperative position substantially parallel with said operative position.

4. In an automobile transporting vehicle, a main frame, a movable upper deck structure and a fixed lower deck carried thereby, front and rear pivotal mountings on said main frame, and linkages connecting said pivotal mounting with said upper deck structure thereby to mount said upper deck structure for upward translatory movement relative to said main frame.

5. In an automobile transporting vehicle, a main frame, a movable upper deck structure and a fixed lower deck carried thereby, a pivotal mounting on said main frame, a lever mounted to swing on said pivotal mounting and having one end thereof secured to said upper deck structure and a spring connected with said lever in such manner as to assist the movement of said deck structure.

6. In an automobile transporting vehicle, a main frame, a movable upper deck structure and a fixed lower deck carried thereby, front and rear pivotal mountings on said main frame, linkages connecting said pivotal mounting with said upper deck structure thereby to mount said upper deck structure for upward translatory movement relative to said main frame, and a spring operatively connected with one of said linkages to assist the movement of said upper deck structure.

7. The combination with an automobile transporting vehicle having a lower deck and a frame for supporting an upper deck structure, of means for moving said upper deck structure upwardly to an inoperative out-of-the-way position comprising an arm having one end pivoted on said frame and its opposite end pivoted on said upper deck structure, and another arm comprising two hingedly connected levers one pivoted on said frame and the other pivoted on said upper deck.

8. The combination with an automobile transporting vehicle having a lower deck and a frame for supporting an upper deck structure, of means for moving said upper deck structure upwardly to an inoperative out-of-the-way position comprising an arm having one end pivoted on said frame and its opposite end pivoted on said upper deck structure, another arm comprising two hingedly connected levers one pivoted on said frame and the other pivoted on said upper deck, and counterbalancing means associated with one of said levers.

9. The combination with an automobile transporting vehicle having a lower deck and a frame for supporting an upper deck structure, of means for moving said upper deck structure upwardly to an inoperative out-of-the-way position comprising an arm having one end pivoted on said frame and its opposite end pivoted on said upper deck structure, another arm comprising two hingedly connected levers one pivoted on said frame and the other pivoted on said upper deck and counterbalancing means associated with said first mentioned lever.

10. The combination with an automobile transporting vehicle having a lower deck and a frame for supporting an upper deck structure, of means for moving said upper deck structure upwardly to an inoperative out-of-the-way position comprising an arm at each side of said upper deck, each of said arms having one end pivoted on said frame and its opposite end pivoted on said upper deck structure, and a pair of counterbalanced links mounted on said frame and connected to a central portion of said deck to assist the upward movement thereof.

11. The combination with an automobile transporting vehicle having a lower deck and a frame for supporting an upper deck structure, of means for moving said upper deck structure upwardly to an inoperative out-of-the-way position comprising pivoting means limiting the movement of said upper deck, and a counterbalanced linkage unit mounted on said frame and connected to said upper deck structure to assist the upward movement thereof.

12. In an automobile transporting vehicle, a main frame, a movable upper deck structure and a fixed lower deck carried thereby, a spring balanced lever unit mounted on said main frame connected with a central part of said upper deck structure to assist translatory movement thereof relative to said lower deck, and a link connecting said frame and upper deck structure and cooperating with said spring balanced lever to effect a translatory movement of said upper deck structure.

13. The combination with an automobile transporting vehicle having a lower deck and a frame for supporting an upper deck structure, of means for moving said upper deck structure upwardly to an inoperative out-of-the-way position comprising a plurality of linkages connecting said upper deck structure with said frame, one linkage being connected with said upper deck structure at a substantially central part of said upper deck structure, and counterbalancing means connected with said centrally connected linkage to assist the movement of said upper deck.

14. The combination with an automobile transporting vehicle having a lower deck and a frame for supporting an upper deck structure, of means for moving said upper deck structure upwardly to an inoperative out-of-the-way position comprising a plurality of linkages connecting said upper deck structure with said frame, one linkage being connected with sad upper deck structure at a substantially central part of said upper deck, counterbalancing means connected with said centrally connected linkage to assist the movement of said upper deck, and another of said linkages being connected to said upper deck structure adjacent to the front end thereof.

15. In an apparatus of the type defined, a supporting frame work, a movable load carrying deck having a plurality of laterally projecting supports adapted to engage said framework and support said deck in an operative load carrying position, and means for guiding said deck from its load carrying position to an upper inoperative position in a translatory path of movement comprising a pair of articulated linkages, one located substantially centrally of said deck and permitting one end of said deck to be raised on one of said supports as a fulcrum and the other of said linkages being connected to said deck adjacent said support and serving to guide the movement of the deck as the other end thereof is raised.

LYNN M. FRANCIS.